United States Patent [19]

Kraft et al.

[11] Patent Number: 5,265,305
[45] Date of Patent: Nov. 30, 1993

[54] AUTOMATIC CONTROL DEVICE FOR THE CLEANING POWER OF A VACUUM CLEANER

[75] Inventors: Manfred Kraft, Neubulach; Gerhard Kurz, Stuttgart, both of Fed. Rep. of Germany

[73] Assignee: Interlava AG, Lugano, Switzerland

[21] Appl. No.: 452,516

[22] Filed: Dec. 18, 1989

[30] Foreign Application Priority Data

Jan. 21, 1989 [DE] Fed. Rep. of Germany ....... 3901767
Jan. 30, 1989 [DE] Fed. Rep. of Germany ....... 3902647

[51] Int. Cl.$^5$ .............................................. A47L 5/00
[52] U.S. Cl. ....................................... 15/319; 15/339; 388/815
[58] Field of Search ................. 15/319, 339; 318/481; 388/815, 830; 55/210, 211; 417/19, 43, 423.3

[56] References Cited

U.S. PATENT DOCUMENTS

| | | | |
|---|---|---|---|
| 2,580,643 | 1/1952 | Doughman | 55/211 |
| 2,789,660 | 4/1957 | Brown | 55/213 |
| 3,577,869 | 5/1971 | Hosokawa et al. | 15/319 X |
| 4,021,879 | 5/1977 | Brigham | 15/319 |
| 4,099,291 | 7/1978 | Bowerman | 15/390 |
| 4,357,729 | 11/1982 | Van der Molen et al. | 15/319 |
| 4,399,585 | 8/1983 | Kullik et al. | 15/319 |
| 4,510,425 | 4/1985 | Yukota et al. | 318/481 |
| 4,514,874 | 5/1985 | Kurz | 15/339 |
| 4,596,514 | 6/1986 | Matsumoto et al. | 318/481 |
| 4,601,082 | 7/1986 | Kurz | 15/319 |
| 4,654,924 | 4/1987 | Getz et al. | 15/319 |
| 4,701,192 | 10/1987 | Burke | 15/319 |
| 4,806,833 | 2/1989 | Young | 318/254 |
| 4,920,607 | 5/1990 | Köhn | 15/319 |
| 4,942,640 | 7/1990 | Hayashi et al. | 15/319 |
| 4,958,406 | 9/1990 | Toyoshima et al. | 15/319 |

FOREIGN PATENT DOCUMENTS

| | | | |
|---|---|---|---|
| 0362894 | 4/1990 | European Pat. Off. | 15/319 |
| 573224 | 3/1933 | Fed. Rep. of Germany . | |
| 2819193 | 11/1979 | Fed. Rep. of Germany . | |
| 3117507 | 10/1982 | Fed. Rep. of Germany . | |
| 2016910 | 3/1978 | United Kingdom . | |

Primary Examiner—Henry J. Recla
Assistant Examiner—Glenn T. Barrett
Attorney, Agent, or Firm—Darby & Darby

[57] ABSTRACT

In connection with an automatic control device for the cleaning power of a vacuum cleaner, comprising a blower, a blower drive motor and an associated control circuit for the latter, it is proposed to provide two vacuum switches adjusted to different vacuum threshold value or one vacuum double switch presetting the two vacuum threshold values, and to drive a storage (counter, capacitor), whose output configurations determine the manner in which a phase control circuit, which is connected in series with the blower drive motor, is driven, by a corresponding configuration of the switching conditions of the said switches. It is possible in this manner, with only two existing vacuum switches, to operate the blower drive motor at a predetermined power plateau, without any switching actions, so long as the vacuum generated remains within a predetermined window.

21 Claims, 5 Drawing Sheets

AUTOMATIC CONTROL DEVICE FOR THE CLEANING POWER OF A VACUUM CLEANER

BACKGROUND OF THE INVENTION

The present invention relates to an automatic control device for the cleaning power of a vacuum cleaner.

A known device of this type (DE-PS 31 17 507) comprises a vacuum switch arranged in the vacuum area of the vacuum cleaner and designed in such a manner that at least two different negative pressures can be detected and transmitted to a corresponding evaluation circuit, by corresponding adjustment of the circuit. In practice, however, the design of the known vacuum switch is such that three electric contacts can be made, in response to different negative pressures, for controlling the motor speed by corresponding switching actions. This is achieved by a contact plate which is driven by a diaphragm and which coacts with counter-contact pieces which are arranged at different spacings relative to the contact plate and which are contacted successively by the contact plate, depending on the prevailing negative pressure. To establish the contact, the contact plate performs a pivoting movement. The different spacings can be adjusted by axial displacement of the counter-contact pieces.

The different contacts established permit, for example, the activation of (additional) resistors in the triggering circuit for a phase control controlling the drive motor of the blower of the vacuum cleaner. Consequently, it is possible to predetermine a number of different power stages for the blower drive motor equal to the number of contacts that can be made by the existing vacuum switches at different negative pressures of the vacuum cleaner. However, from the point of view of precision mechanics, the input required for the individual adjustments of the vacuum switch or vacuum switches responding to the respective negative pressures is quite considerable and is even increased by the additional setting work which is required subsequently.

According to another known system, there is provided a control switch which is automatically adjusted by the negative pressure generated by the blower of the vacuum cleaner and which either triggers different winding portions of the electric motor driving the blower or switches on or off corresponding series resistors in response to the prevailing negative pressure (DE-PS 573 224).

As the vacuum cleaner using this known control circuit is of the so-called beater-sweeper type where the front portion of the cleaner housing forms the suction nozzle over its whole width and accommodates an additionally driven beater roller, the control switch is designed in such a manner that it comprises a flap or plate which extends over the full width of the vacuum cleaner and is seated in the upper portion of the nozzle and which can be rotated, by the negative pressure prevailing at any time, about a pivot point so as to turn a wiper of the control switch via a linkage in such a way as to enable the switching actions between the windings or resistors. In order to permit the control flap to react to varying negative pressures, seals in the form of bellows are provided on both sides of the flap. It may be regarded as a disadvantage of such known control switches that the dimensions, in any case the width, of the pressure-sensitive area is practically as big as the vacuum cleaner housing and that the switching actions required for controlling the suction power can be effected only by applying considerable force, via a mechanical linkage, whose kinematic end portion is provided with a spring-loaded quick-break switch which is then immediately transferred to another switching state. The known device cannot react with the required sensitivity to minor differences in negative pressure, and in addition there is always the possibility that the whole automatic control system may quickly become unserviceable because it is arranged directly in the suction area and, consequently, exposed to the dirt particles which tend to settle everywhere and which may then present a considerable obstacle to, or may even fully suppress, the sliding movements required for the switching actions.

DE-OS 28 19 193 describes a vacuum cleaner equipped with a speed governor for the blower unit where a final control element of the control circuit of the blower motor reacts to the negative pressure generated by the blower in operation. The final control element comprises an intake piston seated in a cylindrical housing which communicates with a vacuum connection, and the piston rod of the intake piston is coupled with a slide resistance which in turn is part of the automatic control system for the motor. Although this arrangement provides an analogue possibility to influence the blower motor control, it also requires that considerable negative pressures be made available for rendering possible the control movements of the piston in its cylinder, which are heavily impaired by friction, and the sliding movements of the slide resistance. However, the variations in negative pressure encountered in vacuum cleaners, for example in response to the filling level of the dust bag, are in some cases extremely small so that they cannot be utilized for controlling the blower motor.

DE-GM 80 00 772 proposes to influence the control of the suction power of an electric vacuum cleaner manually either by providing a plurality of vacuum switches having different switching thresholds so that the motor power can be subdivided into additional power stages, or by providing additional switching positions for an existing vacuum switch. The publication does, however, not provide any information as to how this can be achieved. It is particularly problematic in this case that when a plurality of vacuum switches is arranged the switch having the highest sensitivity value necessarily has to take part in all switching actions so that it is not possible, at least not in the manner described in such general terms, to effect specific switching actions at different negative-pressure values. In addition, it may be a disadvantage that the at least one vacuum switch provided must present an extreme hysteretic behavior if after switching over to another switching state, for example as a result of a variation in negative pressure provoked manually, for example by blocking the suction line, it is to remain in this state even when the suction line is released later. On the other hand, however, the publication also states that the system will switch back to its original state after full release of the suction line.

Another manual suction power control for a vacuum cleaner has been known from DE-PS 33 07 002. Here, too, at least two diaphragm switches which are set to different response thresholds, i.e. sensitivity values, are arranged in the negative pressure area of the vacuum cleaner. The design of the diaphragm switches is such that they respond to variations in negative pressure provoked deliberately by blocking manually the suction line whereby a subsequent speed control circuit is enabled to switch over between three power stages, for example. However, it is a problem of this known manual suction power control that the vacuum switches will of course also respond to pressure peaks occurring unintentionally in operation or to general pressure variations, and that above all the individual diaphragm switches will have to be interlocked mutually since otherwise all vacuum switches, including those which are set to lower vacuum threshold values, will respond simultaneously if a sufficiently strong pressure variation is encountered.

Now, it is the object of the present invention to designate automatic control device for the suction power of a vacuum cleaner in such a manner that the power control obtained operates sensitively, i.e. practically in imperceptible steps, that the design is such that frequent switching, i.e. frequent variations of the power data of the blower drive motor of the vacuum cleaner are avoided, and that the control arrangement exhibits a simple, reliable and particularly low-cost structure, also from the point of view of precision mechanics.

The invention solves this problem with the aid of the characterizing features of the main claim and provides the decisive advantage that the only two vacuum switches required provide a window effect for the pressure conditions which can be evaluated electronically so that it is now possible, on the one hand, to utilize the full power range of the blower drive motor for the vacuum cleaner and, on the other hand, to achieve long-term plateau operation for the drive motor so that excessively frequent switching is avoided while on the other hand any switching operation that may become necessary due to changed external operating conditions will be effected sensitively and without reving up the motor abruptly. It is ensured in this case that the predetermined power value of the blower drive motor will be maintained, i.e. that no switching will take place, as long as the vacuum values, for example in the suction area of the vacuum cleaner, remain within a defined vacuum window. As soon as the desired vacuum value can no longer be kept within this defined window, the two pressure switches determining an upper and a lower pressure threshold value, respectively, will react by a corresponding adjustment of the power of the drive motor, which is achieved by their combined effect, so that the vacuum value will be returned to within the range defined by the window.

It has become possible in this manner to prevent the power control of the blower drive motor from oscillating and, under certain circumstances, to operate the vacuum cleaner, even for extended times, at a constant power level exactly adapted to the respective operating requirements. The input circuit for the control circuit, which determines the power output of the blower drive motor, is provided with a memory function so that previous operating conditions and the vacuum data that can be derived therefrom are also taken into consideration for determining the momentary power output of the vacuum cleaner. Consequently, the invention is no regulating switch of the usual type which evaluates comparisons between a desired value and an actual value and which then tries to remove any deviation resulting therefrom. In contrast the deviation which is derived from the comparison between the desired value and the actual value and which is represented, in the case of the invention, by a specific switching contact combination of the two vacuum switches, is at first processed, giving due consideration to previous switching conditions and certain related, stored values, and is then used for deriving therefrom the triggering value for the motor power switching circuit.

According to a first embodiment of the invention, the structure of such a control circuit is simplified advantageously by the fact that apart from the two vacuum switches which are set to different pressure values the arrangement only includes a counter, a timer, a decoder connected to the output of the counter, and a phase control for the power control of the motor which is triggered by the decoder. The individual components may all be highly integrated, or else the entire circuit may be integrated and mounted, together with the two vacuum switches, on one circuit board or card, or stored as a program sequence in a computer or microprocessor processor—this applies to both embodiments.

According to another embodiment of the invention, an analogue storage, in the simplest of all cases a capacitor, is provided instead of a counter operating as a storage or memory, in which case the charging condition of the analogue storage, which is a function of the switching configuration of the two vacuum switches, determines the power output of the vacuum cleaner in automatic operation. It goes without saying that there are further provided additional conventional switching-over means which can be used by the operator for switching off the automatic feature and switching over to specific power stages manually, for example to a maximum or a minimum power stage.

Depending on the type of the recorded negative pressures acting on the pressure switches, it is finally possible to tailor the control circuit for the blower motor to specific operating requirements, giving regard either predominantly to the properties of the floor on which the vacuum cleaner is to be operated, or—alternatively or in addition—to the filling level of the dust bag. This can be achieved by detecting the prevailing negative pressure, which is supplied to the vacuum switches, in different areas of the vacuum cleaner, for example in the nozzle intake area or, in the case of a cylinder cleaner, for example at the point where the pipe opens into the main body of the vacuum cleaner, or in the area behind the dust bag and before the blower, or by detecting the pressure of the exhaust flow behind the blower. These conditions depend of course also on the particular arrangement of the individual components in the vacuum cleaner; in certain types of vacuum cleaner the dust bag may of course also be arranged behind the blower.

It is not necessary to arrange the vacuum switches at the described points physically; rather, it will be sufficient for the purposes of the invention if the vacuum is tapped at those points by means of small connection hoses and supplied, via small hoses, to the respective surfaces of the pressure switches which as such may be arranged at a different point, or may even be enclosed in a separate, small protective housing.

The features described by the sub-claims permit certain advantageous improvements and developments of the device specified by the main claim. A particularly advantageous solution is seen in the use of pneumatic diaphragm switches as pressure switches, as certain special embodiments thereof can be adjusted to the respective desired vacuum threshold values very sensitively. Certain known embodiments of such vacuum switches, which are preferably diaphragm-controlled, are described in detail by the before-mentioned DE-PS 31 17 507 and DE-PS 33 07 002 of the same applicant. In this connection, vacuum diaphragm switches are preferred which are capable of performing several switching operations in one housing, for example due to the possibility to pivot a diaphragm-driven contact plate. Consequently, it is also possible to use a single diaphragm switch comprising several adjustable switching positions, for example one of the type described by DE-PS 31 17 507, and to leave one of the existing three switching contacts unused as only two switches are required for the purposes of the present invention.

It is further regarded as advantageous if the counter according to the first embodiment of the invention, whose output configuration—which may be supplied for example in the form of a BDC code—controls the respective power stages of the blower motor, is provided with interlocking and reset means in such a manner that the counter will not flow over (revert to the lowest count) when being activated continuously, but will be kept at, or set back to final values in this case so as to prevent abrupt transitions and variations in the control of the blower motor.

It is further regarded as advantageous if a luminous band or strip, which may also consist of discrete individual lamps, can be activated in such a manner as to provide the operator with information as to which of the suction power stages available is switched on at any time. Generally, the adaptation to changing conditions works automatically, but given the plurality of possible switching stages it is also possible to predetermine certain particularly advantageous regulating characteristics for the speed of the blower motor of the vacuum cleaner. So, it is possible for example to increase or reduce the speed and, correspondingly, the suction power made available as the negative pressure rises in the suction area; for example, when the suction brush is pressed more strongly upon the surface to be worked, for example the carpet or upholstery, or the like, and is thus blocked, the suction power available may also be increased so that greater dirt particles, lint or threads can be picked up by the vacuum cleaner under difficult conditions. Finally, the arrangement may be further supplemented by manual change-over means, which may be arranged for example in the area of the operating handle and which may consist of switches by which certain basic values or selective operating behavior patterns can be preselected externally for the control and regulating circuit for the cleaning power so that the vacuum cleaner can then be operated in the manner of different cleaning programs. So, it is possible for example, when cleaning curtains or other light material, to limit the maximum suction power by blocking for example certain counter positions. However, it should be noted in this connection that basically the automatic power control according to this invention is a regulating process which consists in tapping the vacuum produced by the blower motor in the form of an actual value, comparing the latter with corresponding threshold values (for example in the manner of a window discriminator) and adjusting the control of the blower motor correspondingly.

BRIEF DESCRIPTION OF THE DRAWING

Certain embodiments of the invention will now be described with reference to the drawing in which.

DESCRIPTION OF THE EMBODIMENTS OF THE INVENTION

The basic idea of the invention, therefore, consists in providing the possibility to adjust the power output of the vacuum cleaner in a controlled manner and sensitively to the respective vacuum and operating conditions of the vacuum cleaner, and to avoid the known disadvantages of two-point controls and achieve stabilized operation without repeated switching actions and corresponding jerks in the power output of the motor. This is accomplished by smoothing the evaluation of only two actual values that can be detected by vacuum switches by the inclusion of storage, and converting an evaluation in this manner into a deviation signal which varies steadily or remains constant.

Figure 1:
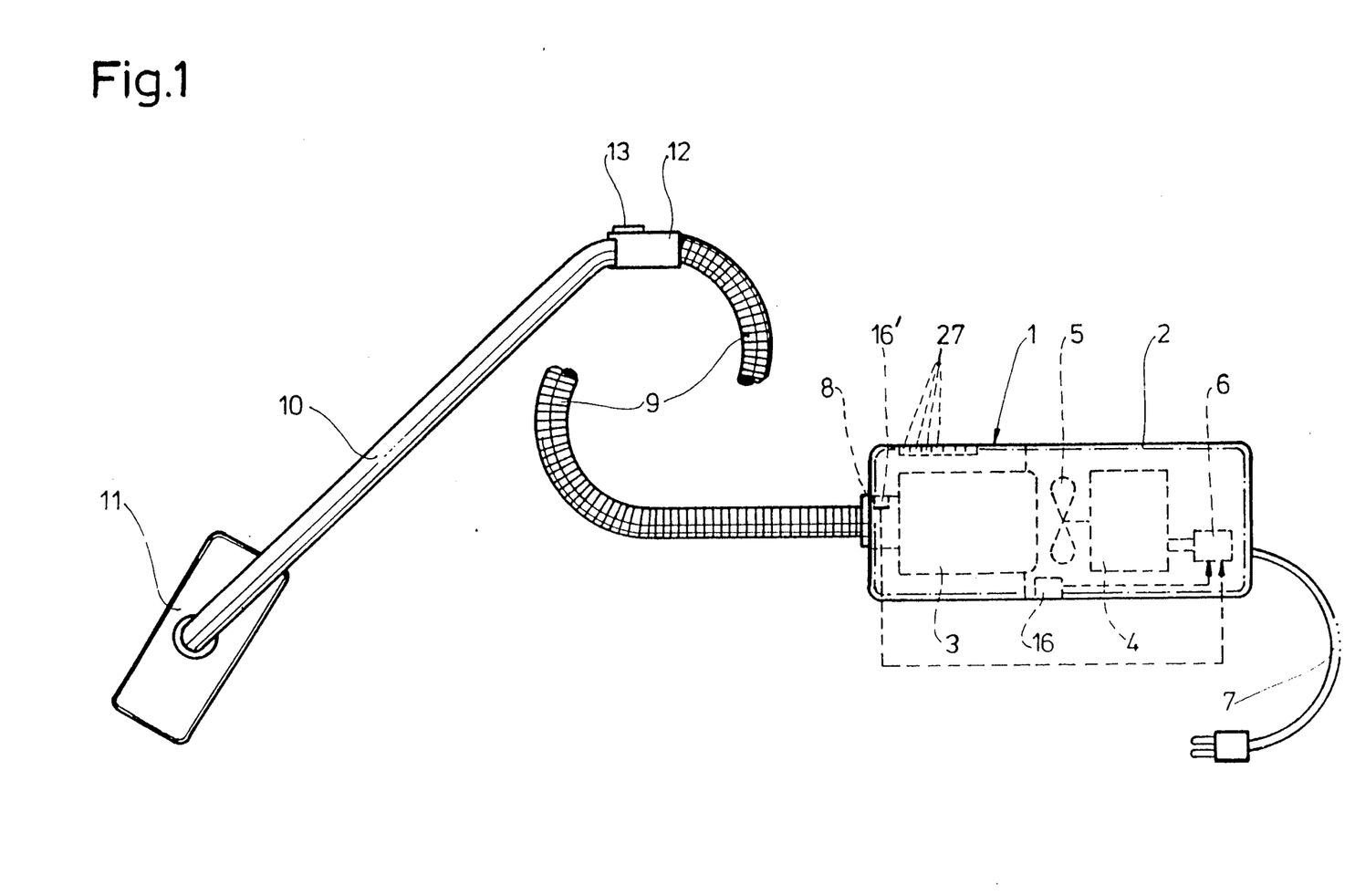
FIG. 1 is a diagrammatic view of a vacuum cleaner comprising a plurality of vacuum receivers arranged at different points in the vacuum cleaner area.

Regarding now FIG. 1, the body of the vacuum cleaner is designated by reference numeral 1; it comprises a housing 2 accommodating the dust bag 3, the blower 5 driven by the motor 4 and an electric or electronic control circuit 6. One can further see a connection 7 leading to an external current source; in the case of this embodiment of the invention, the suction opening 8 of the vacuum cleaner is usually connected to a flexible plastic or metal hose 9 and, via the latter, to another rigid pipe 10 carrying on its end a suction brush 11 or a similar utensil. A handle or a guide element 12, which is intended for being gripped by the operator, is provided in the case of this embodiment at the point of transition between the flexible hose 9 and the rigid pipe 10.

In operation of the vacuum cleaner, vacuum variations will be encountered as a function of the degree to which the area of the suction opening, for example of the brush 11, is sealed off from the surrounding air, of the properties of the surface to be cleaned (carpet, deep-pile carpet, textile floor covering, wooden or stone flooring, or the like), or of the filling level of the dust bag which is of course also a factor that influences the vacuum in the nozzle area of the vacuum cleaner.

For example, when a brush is pressed more strongly upon the surface to be cleaned, in particular a carpet, this will also lead to the opening being sealed off to a greater degree and, accordingly, to a higher negative pressure since the residual air volumes flowing past the suction brush are reduced in this case.

For recording the vacuum values prevailing in the area of the vacuum cleaner, vacuum switches may be arranged at different points, for example at 16 and 16' in the embodiment illustrated in FIG. 1. The output lines of these vacuum switches 16 and 16' are connected to the electronic control circuit 6.

A first embodiment of the electronic control circuit is designed in the manner illustrated in FIG. 2 and will be explained hereafter in more detail. It is understood, however, and this fact is expressly stressed once more, that certain parts or even the whole control circuit of both embodiments may be provided in analog, hybrid or digital design, and may also be highly integrated, or may be combined either in full or in part and connected to a program-controlled logic circuit, for example a computer or the like, which then performs the corresponding functions, as will be described further below. Accordingly, the invention is characterized by the functions described below and is neither tied to, nor limited by the discrete circuit elements that will be described hereafter.

Figure 2:
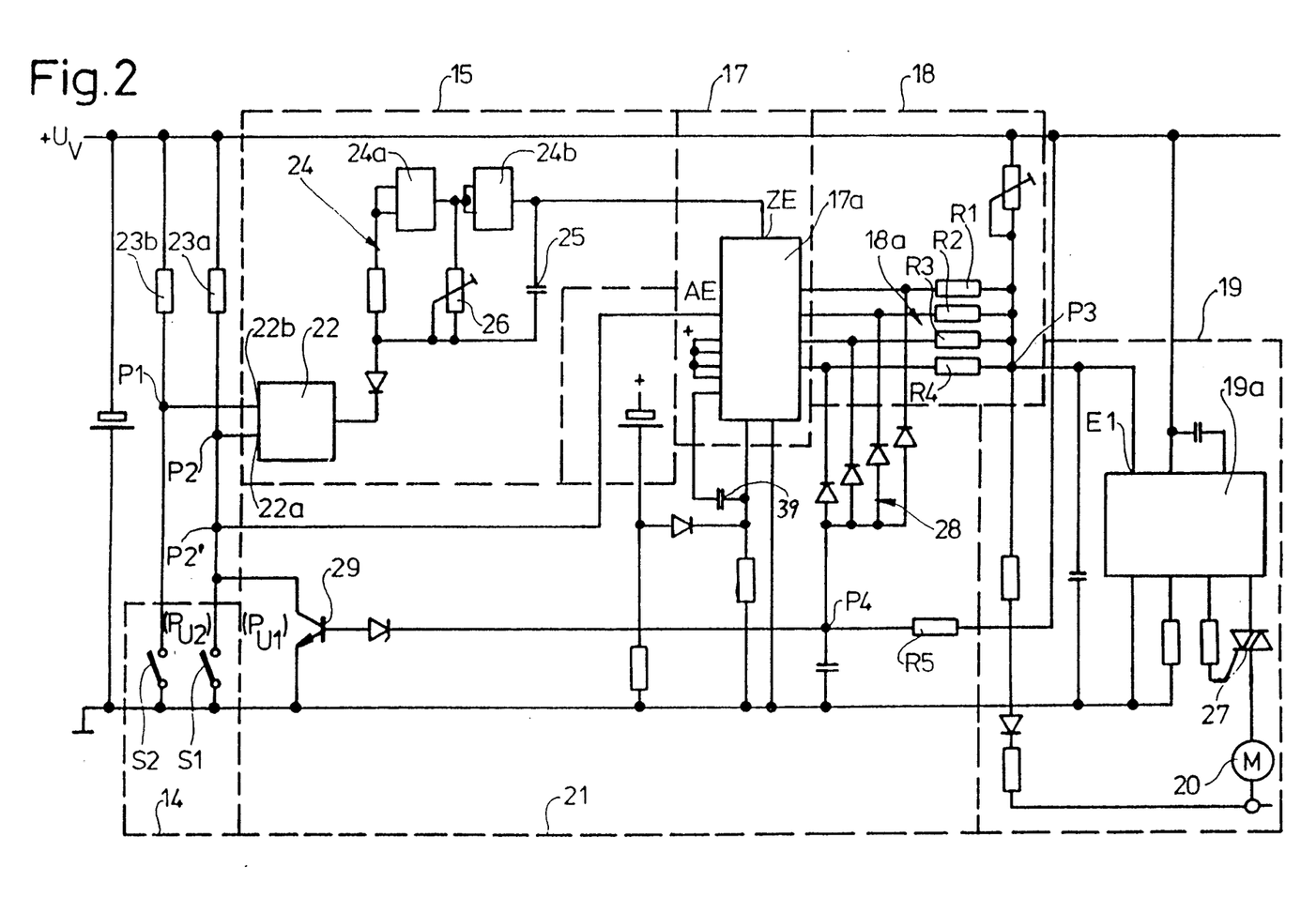
FIG. 2 shows the basic structure of the control circuit according to the invention in the form of a block diagram (broken lines) and simultaneously a detailed representation thereof in the form of discrete components including the IC modules used.

Regarding now the illustration of FIG. 2, and here in particular the general functional blocks indicated in broken lines in FIG. 2, the electronic control circuit for the power supplied to the blower drive motor comprises a pressure sensor block 14, a timer 15 triggering the counting circuit 17, a decoder circuit 18 connected to the outputs of the counting circuits 17 and, following the latter, a power control circuit (phase control) 19 for the drive motor 20 of the blower 5. Further, one can see certain peripheral circuits in the form of interlocking and reset means 21 which are directly connected to the counter and which ensure that when the counter is triggered continuously, it will not return automatically to the initial counter setting zero after reaching its final position, or jump to the maximum counter position when triggered in the opposite direction and when the counter position zero has been reached.

The basic function of the arrangement is such that the two pressure switches S1, S2 excite or switch off the timer 15, via a triggering gate 22, as a function of their respective switching conditions (both open, both closed, one open and one closed), and that the counting pulses of the timer 15 are received by the counting circuit 17 and translated into an output configuration. The latter is then used by the decoder circuit 18 to derive, for example, an analog control signal for the power control circuit 19 (phase control), whereby the blower drive motor 20 is controlled correspondingly as regards its speed and power output.

The detailed circuit illustration shows the two pressure switches S1, S2 in the form of normally-open contacts which close under the action of a specific vacuum and which then short the series resistor 23a, 23b to ground, whereby the two circuit points P1 and P2 between the pressure switches S1, S2 also assume ground potential.

It be assumed that the first pressure switch S1 (preferably, both pressure switches are diaphragm-controlled pressure switches and adjustable to the respective response values extremely sensitively and exactly) responds in the presence of a first, given, lower vacuum Pu1 which—in order to provide a numerical value which is, however, not to be understood as limiting the invention—may be in the range of, for example, 50 mbar. The second vacuum switch S2 then responds at a higher vacuum Pu2 of, for example, 150 mbar.

It be initially assumed that both vacuum switches S1 and S2 are located in the area of the vacuum switch 16' illustrated in FIG. 1 so that they react to the pressure prevailing before the dust bag 3 or, which is substantially the same, to the negative pressure developed in the intake area of the brush 11.

A third circuit point F2', whose potential is identical to that of the circuit point P2, controls an up/down counting input AE of an up/down counter 17a of the counting arrangement 17. The up/down counter 17a may, preferably, be designed as a 16-bit counter, as in the illustrated embodiment.

The potential of the circuit points P1 and P2 determines the function of the triggering gate 22 for the astable oscillating circuit 24 of the counting circuit 15. Preferably, the triggering gate 22 is a negating exclusive OR gate, i.e. an Ex-NOR gate. The astable oscillating circuit comprises two Ex-NOR gates 24a and 24b connected in series which are coupled back via a capacitor 25. A setting resistor 26 in the form of a trimmer determines the frequency of the astable oscillating circuit composed of the two NOR gates 24a, 24b. The output frequency generated by the astable oscillating circuit is kept deliberately low and may be in the range of, for example, only 1 Hz; it is supplied to the counting input ZE of the counter 17a.

Depending on the computed counter reading, a specific output configuration is then obtained at the outputs Q0, Q1, Q2 and Q3 of the up/down counter 17a, in the form of a binary word which is then translated, via a resistor combination 18a forming the decoding circuit 18, into a level at the circuit point P3 whose analog voltage value varies sensitively in steps. To say it in other words: One obtains at the circuit point P3 a potential which develops steadily in upward or downward direction and which varies according to the output configuration of the counter 17a without abrupt transition, which potential is then applied to the control input E1 of an IC phase control module 19a. The output of the latter is connected to the usual triac configuration 27 which is connected in series, in the conventional manner, to the blower drive motor of the vacuum cleaner.

The function obtained is then as follows: when the vacuum cleaner is switched on, both pressure switches S1, S2 are initially in the open position, as no vacuum exists at this time.

This means that positive potential is present at the circuit points P1 and P2 with P2', with the result that the astable oscillating circuit 24 is excited via the Ex-NOR gate 22 whereby the counter 17a is activated. At the same time, positive potential at the up/down counter input AE of the counter 17a is representative of the upward counting direction, starting from the circuit point P2', so that a gradually rising control voltage for the phase control circuit 19 will be obtained by the corresponding variation of the high-level output connections Q0 to Q3 and through the translation effected with the aid of the decoding resistors R1, R2, R3, R4.

Besides, it will be appreciated that this enables a smooth-starting phase to be realized for the blower drive motor so that no additional, separate controls are required for this purpose.

When the first pressure threshold value Pu1 is reached, the first pressure switch S1 will close and remove the positive potential from both the one input terminal 22a of the Ex-NOR gate 22 and the up/down counter input AE of the counter 17a. This means that the astable oscillating circuit 24 will cease to emit counting pulses, being no longer triggered by its triggering gate 22; at the same time, however, the counting direction at the counter 17a is reversed as a preparatory measure so that the counter will now count in downward direction.

Figure 3:
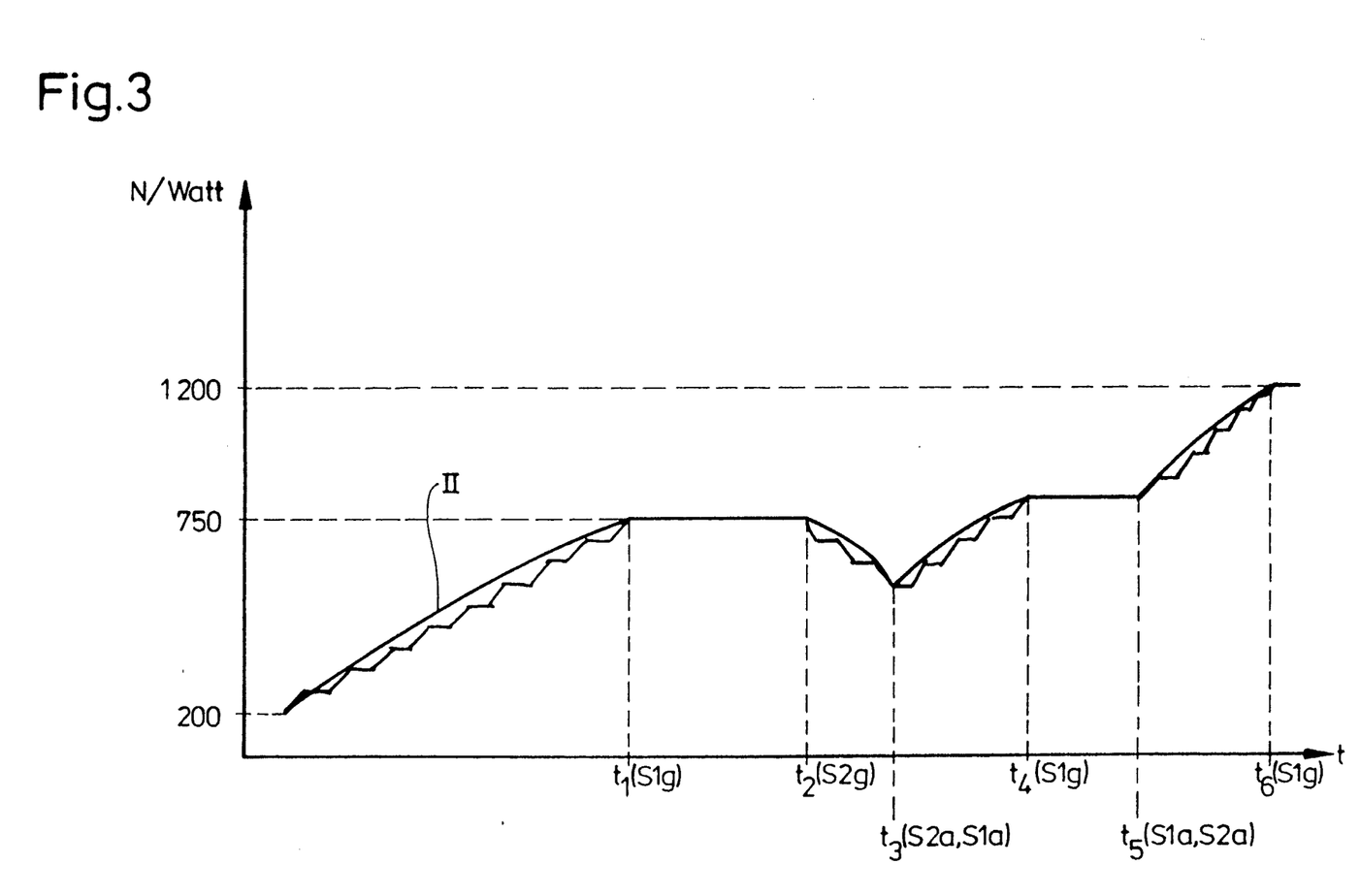
FIG. 3 shows one possible power control curve of the blower motor, as a function of the positions of the vacuum switches over time.

Referring now to the diagram of FIG. 3, these processes take place up to the point in time t1 when the first switch S1 closes and remains closed (S1g). This means that after this point in time the power output of the blower drive motor 20 will remain constant as no changes occur after that time at the control input E1 of the phase control module 19a.

Figure 4:
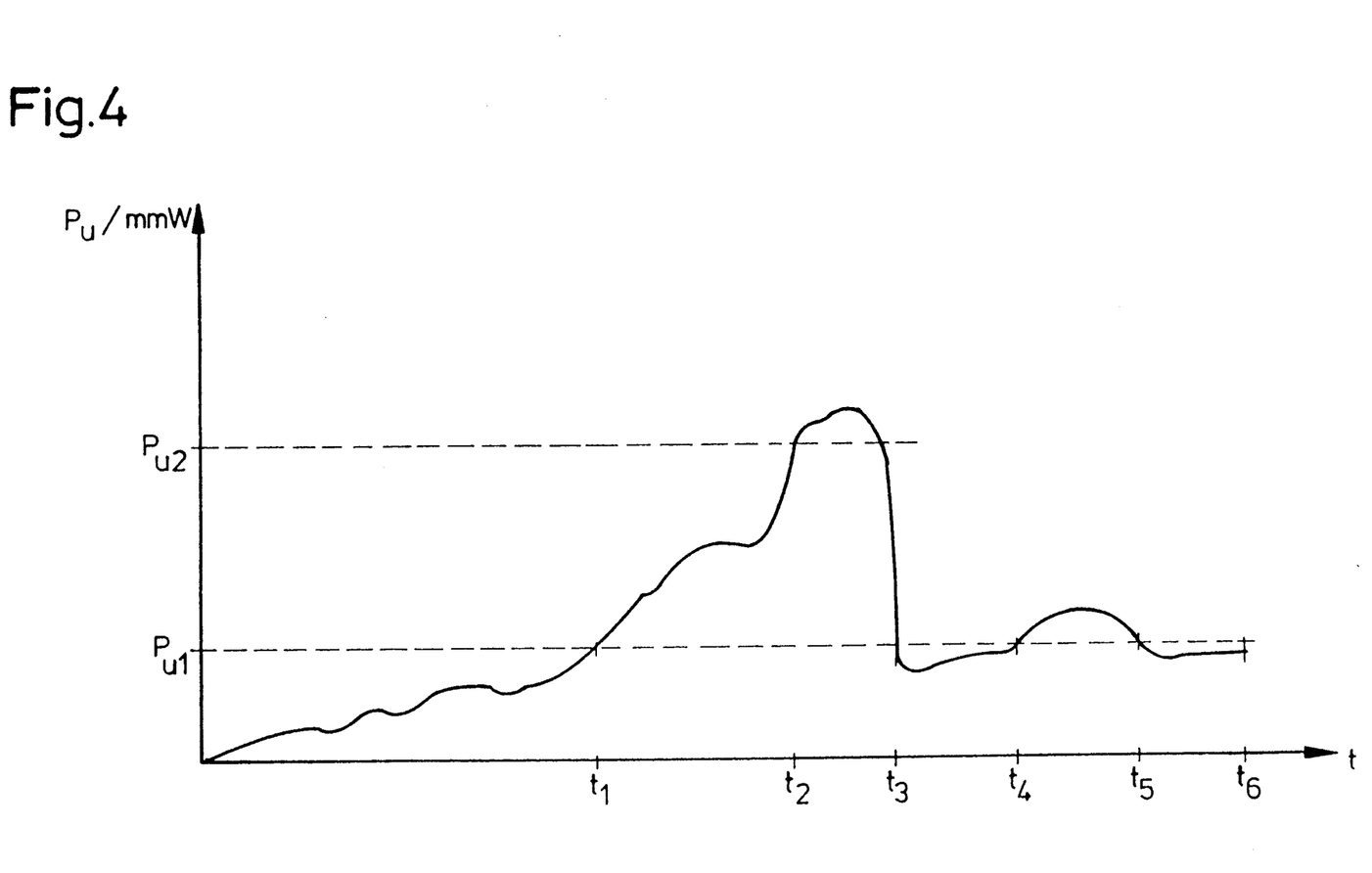
FIG. 4 shows the corresponding curve of the pressure variations that lead to the respective pressure-switch reversing operations, i.e. the curve of the vacuum produced by the vacuum cleaner blower over time.

However, it cannot be excluded that varying influences in the suction area may lead to a corresponding increase of the vacuum, as indicated in the diagram of FIG. 4, after the point in time t1, by the negative pressure rise between the points in time t1 and t2.

Such a negative pressure rise may, for example, be due to the fact that the vacuum cleaner is now operated on a deep-pile carpet material, in which case the sealing effect rises and, besides, the manual effort required for moving the brush is increased considerably. As this effect is undesirable, or in order to prevent negative pressure variations of this magnitude quite generally, the second vacuum switch S2 is adjusted to a higher or upper vacuum value Pu2 and will close at the point in time t2 when the negative pressure curve exceeds this threshold value. Then both pressure switches S1 and S2 are closed, the circuit points P1 and P2 carry again the same potential, and the Ex-NOR gate 22 controls again the astable oscillating circuit 24 so that the counter 17a will now count in downward direction and, after decoding, a correspondingly lower control signal will be obtained for the phase control circuit 19a. The power output of the blower drive motor 20 then leaves the plateau at which it had stabilized according to FIG. 3, between the points in time t1 and t2, and is regulated in downward direction until the actual vacuum value measured comes again within the window range between Pu1 and Pu2.

For the purposes of the diagrams of FIGS. 3 and 4 it was, however, assumed that the vacuum drops at this moment below the lower threshold value Pu1 (for reasons that need not be discussed here in detail), so that the switch S1 will open, too; in this case, the effect is the same as described above. Both switches are open—the potential at the circuit point P2' changes over again to upward counting at the counter 17a, and the output is again increased. The further development of the diagrams of FIGS. 3 and 4 is self-explanatory. In the special embodiment explained here, a total of 16 different steps can be realized with the aid of four different output connections Q0, Q1, Q2 and Q3 as known in binary circuit technology, which steps can then be translated into the analog control voltage by the correspondingly sized resistors R1, R2, R3, R4 in the decoding circuit. After 16 upward counting steps, therefore, the counter 17a has reached its maximum output counter reading and the blower drive motor 20 has simultaneously reached its maximum power, as illustrated in FIG. 3.

In order to ensure that in the event higher power should be required due to the particular positions of the vacuum switches the counter will not simply return to its initial zero value, being continuously triggered by the astable oscillating circuit 24, and start its upward counting cycle anew, which would of course mean an abrupt power jerk for the motor, there is additionally provided an interlocking circuit 21 which, in the illustrated embodiment, comprises a diode combination 28 which takes its information from the outputs of the counter 17a and drives a transistor 29 connected in parallel to the first switch S1. It is assumed for the purposes of the present explanations that the maximum power stage corresponds to high-level output connections of all four outputs Q0, Q1, Q2, Q3 of the up/down counter 17a. In this case, all diodes 28 are blocked, and the circuit point P4 assumes positive triggering potential for the transistor 29, via the resistor R5, so that the transistor 29 will connect through and by-pass the switch S1 even though the latter is open in the assumed case. This causes the astable oscillating circuit 24 to be stopped and, at the same time, the counting direction to be reversed so that the maximum output control value for the phase control is maintained. If the pressures in the sensor area change later, this results initially in the lower pressure threshold value Pu1 being exceeded and the switch S1 being closed, which leads to no reactions at all; subsequently, the upper threshold value Pu2 may also be reached, and then the switch S2 will close. This causes the counter 17a to start immediately counting down; its output configuration changes, and at least one of the diodes becomes conductive and causes the circuit point P4 to assume low potential; the transistor 29 blocks, and the normal function is restored.

A similar effect is obtained when the power has stabilized at the lower output value corresponding to zero. In order to prevent that if the counter 17a should continue to count down it will not switch over to maximum output configurations, one makes use of a reset pulse which is generated by the counter itself when the zero value is reached, and applies the latter to the reset input, via a capacitor 39, so that the counter will remain at the output configuration of the zero value and begin to count up anew, starting from this position.

Figure 5:
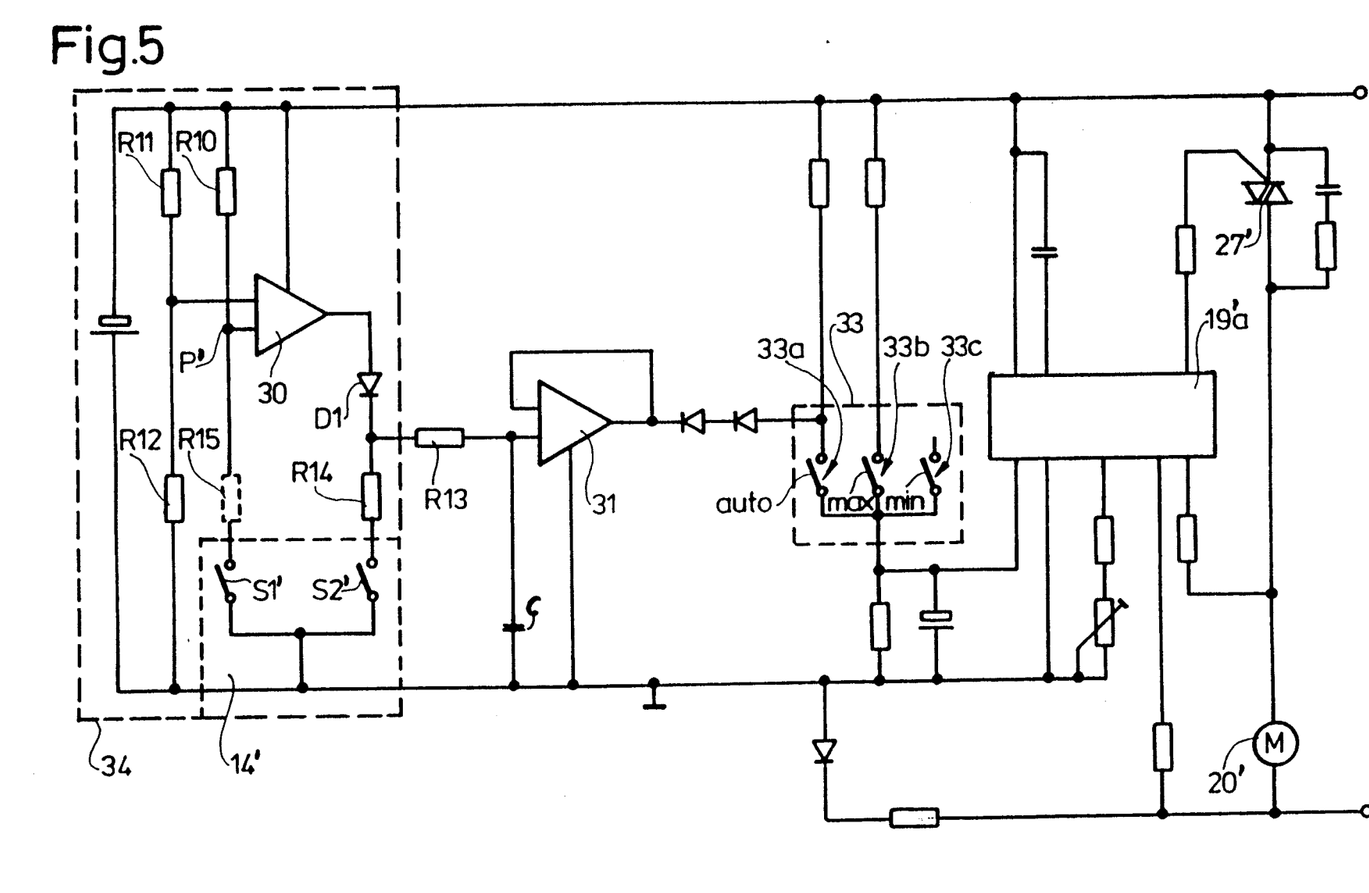
FIG. 5 finally shows the basic structure of another embodiment of the control circuit, likewise partly as a block diagram (broken lines) and simultaneously in the form of discrete components, with an analog storage for evaluating and translating the vacuum switch combination.

A second embodiment of a control circuit, which is even further simplified, is represented in FIG. 5. The following explanations will concentrate only on those components which differ from the representation of FIG. 2, and identical or equivalent components will be designated by the same reference numerals, distinguished only by an apostrophe.

The vacuum switch S1' which closes in the presence of a low negative pressure (Pu1) is connected in series with a resistor R10, the connection point P being connected to the non-inverting input of a subsequent operational amplifier 30. The bias voltage of the other input (inverting input) is determined by a reference voltage divider composed of R11, R12.

A diode D1 which is poled for positive voltages in forward direction, and a subsequent resistor R3 supply the output potential of the operational amplifier or comparator 13 to an analog storage in the form of a capacitor C whose other connection is connected to mass potential.

Another operational amplifier 31 connected to the output of the capacitor 10 takes over the capacitor signal and supplies it to a phase control module 19a' of conventional design which then controls the power triac 27' in series with the drive motor 20' in the usual manner, as a function of the control potential supplied to it. This circuit combination need not be explained here in greater detail; it should, however, be mentioned that a manual switch combination 33 is connected between the output of the second operational amplifier 31 and the input of the phase control module 19a', which switch combination 33 comprises a first switch 33a for the automatic operational control, a second switch 33b, which may be actuated (closed condition) to set the blower motor manually to maximum operation (maximum stage), and finally a third switch 33c serving to preset minimum operating values of the blower motor of the vacuum cleaner, again independently of the automatic-operation settings, acting for this purpose in the manner of an override switch.

The operation of this second embodiment is such that the capacitor C is charged via the first operational amplifier 30 when the switch S1' and of course also the switch S2', which is set to a higher negative pressure value, are both in the open condition. The potential at the capacitor C rises in this case and drives the power of the blower motor 20' up correspondingly via the phase control module 19a', with the automatic switch 13a in the closed condition.

When a first predetermined negative pressure level has been reached, the switch S1' assumes its closed position, and, as the triggering conditions of the first operational amplifier 30 are tuned appropriately, will then maintain a constant level at the output so that the capacitor C2 will no longer change its potential at the input of the subsequent operational amplifier 31. It may be convenient for this purpose to connect an additional resistor R15 in series with the vacuum switch S1'.

If S2' closes as the negative pressure continues to rise—during which process the same curves may be run through as have been described before with reference to the representations of FIGS. 3 and 4—then a discharge circuit is obtained for the capacitor C via the resistors R13 and R14 so that the charge of the capacitor C commences to decrease again continuously and analogously, and the power of the blower motor is regulated down correspondingly.

The functional differences of the embodiment illustrated in FIG. 5, as compared with that of FIG. 2, therefore lie in the fact that—as illustrated by the broken line of the curve II in FIG. 3—the power output variations do not occur in sensitive steps, corresponding to the steps of the counter, but smoothly and continuously, though in this case, too, the power output remains at constant plateau levels in the stabilized condition, as illustrated in FIG. 3 by the curve portions between the points of time t1 and t2 on the one hand and t4 and t5 on the other hand, where plateaus at different levels are obtained.

Both embodiments, therefore, provide the possibility to maintain the vacuum within a predetermined, if desired even very narrow, pressure window. In addition, the present invention may be varied at desire with a view to taking into consideration, for the regulation of the blower drive motor, other, additional operating conditions of the vacuum cleaner, for example the filling level of the dust bag. If, for example, diaphragm-controlled pressure switches are used where both sides of the diaphragm are sealed off from the environment then the pressure switch or pressure switches S1, S2 may be designed as differential switches and the pressure may be supplied to the respective sides of the diaphragms of the pressure switches via lines arranged at suitable points before or behind the dust bag. There is of course also the possibility to work with inverse characteristics; it goes without saying that the circuit discussed above in connection with FIGS. 2 and 5 represents only one of numerous possibilities of controlling the power output of the blower motor in the desired manner, in response to pressure values in the operating area of the vacuum cleaner. These possibilities are then supplemented by the manual control means, for example in the form of a switch 13 (see FIG. 1) or the switches 33.

There is also the possibility, for example, to switch over to another decoding circuit 18 with different characteristics, when actuating the switch.

All features illustrated and explained in the specification, the following claims and the drawings may be essential to the invention either individually or in any desired combination thereof.

We claim:

1. An automatic control device for regulating power to and a negative pressure or vacuum produced by a vacuum cleaner, wherein a blower is driven by an electric motor to generate said negative pressure, said control device comprising:

a control circuit and two switches positioned in the path of the vacuum produced by said blower and operable by the negative pressure applied thereto, said switches having been adjusted to operate each at a different threshold value of negative pressure and connected to the control circuit, such that the blower motor is regulated by the control circuit to increase speed when the vacuum remains below the lower of said vacuum threshold values, the blower motor is stabilized at constant power when the vacuum produced is between the two vacuum threshold values, and said motor is regulated to decrease speed when the produced vacuum exceeds both said threshold values, the vacuum switches being connected in circuit to a storage element whose momentary output value determines the power applied to the blower motor by the control circuit, said control circuit further including means to smoothly change said storage element output value when said vacuum produced in operation is not between said threshold values.

2. A device as in claim 1, wherein said storage element is a capacitor, said control circuit including a charging and discharging circuit connected to said vacuum switches, said charging and discharging circuit charging said capacitor when said vacuum switches are both in the open condition, and maintaining said capacitor at a constant charge voltage as long as the vacuum remains between said two vacuum threshold values, and discharging said capacitor when both said vacuum switches assume a closed condition.

3. A device according to claim 2, wherein an output of the storage capacitor is connected, to an input of a subsequent power phase control circuit which controls a triac connected in series with the blower drive motor.

4. A device according to claim 3, wherein a manually operable switch combination is arranged between the output of the storage capacitor and the input of the phase control circuit, said switch combination having a first switch position for automatic control and at least two additional, manually selectable power output modes.

5. A device as in claim 1, wherein said storage element is an up/down counter whose momentary output value determines the power applied to the blower motor, the different switching positions of at least one of the vacuum switches enabling, respectively, an upward and downward counting direction of the counter, the configuration of said control circuit being such that when the produced vacuum remains between the two vacuum threshold values, the counter maintains its stored count and said blower motor operates at constant power.

6. A device according to claim 5, wherein said counter includes a reset circuit, when in counting down a lower power threshold value of the blower drive motor is reached, said reset circuit prevents the counter from jumping to a maximum counter reading by setting the counter to zero count every time a new counting pulse is received.

7. A device according claim 5, wherein both vacuum switches have normally-open contacts which are activated to close when said vacuum threshold values are reached, the first vacuum switch, being responsive to a lower negative pressure and simultaneously enabling the counting direction of the up/down counter.

8. A device as in claim 5, wherein said control circuit further includes an oscillating circuit and the two vacuum switches enable said oscillating circuit to assume a first oscillating condition when said vacuum switches have identical switching states, and a second condition when said switches have opposite switching states.

9. A device as in claim 8, wherein an output of said oscillating circuit is an input for counting by said up/down counter.

10. A device according to claim 8, wherein said oscillating circuit includes a series connection of two NOR gates coupled back via a capacitor and comprising a setting resistor for determining the frequency.

11. A device as in claim 5, wherein said control circuit further comprises a phase control circuit for driving said blower motor, and the stored count of said counter is decoded and applied as a substantially smoothly rising or falling trigger signal to said phase control circuit to control the phase thereof.

12. A device according to claim 11, and further comprising lines for connection to a supply voltage, wherein the vacuum switches are connected in series with resistors connected at connection points to the supply voltage line, the connection points between the vacuum switches and the series resistors are connected to the inputs of a triggering gate circuit for an oscillating circuit, the first said switch in its open condition determining the upward counting direction, and in its closed condition the downward counting direction of the counter, the counter counting in the upward direction until the lower vacuum threshold value is reached.

13. A device according to claim 12, wherein when only said first pressure switch is closed, the up/down counter is enabled for counting in a downward direction and the oscillating circuit is stopped by a preceding triggering gate circuit being blocked, when the upper vacuum threshold value is reached, the second vacuum switch responds, the counter is activated again and counts down to provide a lower power level of the blower drive motor, the downward counting operation of the counter continues until the vacuum switch determining the upper vacuum threshold value opens again and the blower drive motor then remains at a constant power plateau until the next change in the switching positions of the vacuum switches occurs.

14. A device according to claim 13, wherein the outputs of the up/down counter are connected to a decoding resistor combination, which is connected to a control input of the phase control circuit for driving said blower motor.

15. A device according to claim 11, wherein the phase control circuit is an IC module which drives a control gate of a triac connected in series with the blower drive motor.

16. A device according to claim 5, wherein output values of the up/down counter are connected to an interlocking circuit which interrupts further counting operation when according to a predetermined output configuration of the counter, an upper power threshold of the blower drive motor is reached.

17. A device according to claim 16, wherein the interlocking circuit comprises a diode combination whose output drives a semiconductor element connected in series to one of the vacuum switches.

18. A device according to claim 17, wherein a transistor is connected in parallel to said first switch responding to a lower vacuum threshold value, which transistor assumes a conductive condition when the outputs of the counter exhibit a configuration which is detected by the interlocking circuit diode and which configuration corresponds to a maximum power output of the blower motor, and the interlocking circuit impresses an equivalent switching movement to the first vacuum switch which actually did not take place as a result of the existing vacuum conditions.

19. An automatic control device for regulating power to and a negative pressure or vacuum produced by a vacuum cleaner, wherein a blower is driven by an electric motor to generate a negative pressure, said control device comprising:

a control circuit and two switches positioned in the path of the vacuum produced by said blower and operable by the negative presser applied thereto, said switches having been adjusted to operate each at a different threshold value of negative pressure an connected to said control circuit such that said blower motor is regulated by said control circuit to increasing speed when the vacuum produced by said blower remains below both of said vacuum threshold values, said blower operating at a constant power when the vacuum produced is at a level between said two vacuum threshold values, said motor being regulated by said control circuit to decreasing speed of said blower when both said vacuum threshold values are lower than the vacuum produced by said blower, said vacuum switches being in circuit with a storage element whose momentary output value determines the power applied to said blower motor by said control circuit, said control circuit further including means to substantially smoothly change aid storage element output value when said vacuum produced in operation is not between said threshold levels.

20. A device as in claim 19, wherein said storage element is a counter whose momentary output determines the power applied to the blower motor, the configuration of said control circuit being such that when the vacuum remains in a zone between the two vacuum threshold values, the counter maintains its stored count, whereby said blower motor operates at said constant power, and when the vacuum is outside said zone said counter counts to vary said motor speed.

21. An automatic control device for regulating power to and a negative pressure produced by a vacuum cleaner, wherein a blower is driven by an electric motor to generate said negative pressure, said control device including a control circuit able to operate said blower motor at different power levels, and pressure switch means for detecting a deviation of produced negative pressure from a predetermined standard, said control circuit including a storage element whose momentary output determines the power applied to said blower, and means to change said storage element output in response to said deviation until said deviation is eliminated, the rate of change of said storage element output being predetermined and constant and independent of the magnitude of said deviation.

* * * * *